(12) United States Patent
Serres et al.

(10) Patent No.: US 9,194,282 B2
(45) Date of Patent: Nov. 24, 2015

(54) TURBOCHARGER AND ENGINE CYLINDER HEAD ASSEMBLY

(75) Inventors: Nicolas Serres, Vosges (FR); Alain Lombard, Vosges (FR); Manuel Marques, Flavigny sur Moselle (FR); Jean-Jacques Laissus, Epinal (FR)

(73) Assignee: Honeywell International Inc., Morris Plains, NJ (US)

( * ) Notice: Subject to any disclaimer, the term of this patent is extended or adjusted under 35 U.S.C. 154(b) by 219 days.

(21) Appl. No.: 13/989,629

(22) PCT Filed: Dec. 19, 2011

(86) PCT No.: PCT/US2011/065791
§ 371 (c)(1),
(2), (4) Date: Jul. 18, 2013

(87) PCT Pub. No.: WO2012/087907
PCT Pub. Date: Jun. 28, 2012

(65) Prior Publication Data
US 2013/0291540 A1 Nov. 7, 2013

Related U.S. Application Data

(60) Provisional application No. 61/426,092, filed on Dec. 22, 2010.

(51) Int. Cl.
*F02D 23/00* (2006.01)
*F02F 1/42* (2006.01)
(Continued)

(52) U.S. Cl.
CPC . *F02B 37/02* (2013.01); *F01D 9/02* (2013.01); *F01D 9/026* (2013.01); *F01D 17/105* (2013.01);
(Continued)

(58) Field of Classification Search
CPC ....... F01D 17/105; F01D 25/14; F01D 25/24; F01D 25/28; F01D 25/265; F01D 25/16; F01D 25/162; F01N 13/105; F01N 3/046; F02B 67/10
USPC .............. 60/602, 605.1, 605.3, 599, 598; 123/559.1–559.2, 671, 193.5; 415/145
See application file for complete search history.

(56) References Cited

U.S. PATENT DOCUMENTS 2,991,616 A * 7/1961 Miller ............................ 60/599
3,948,052 A * 4/1976 Merkle et al. ................. 60/605.1
(Continued)

FOREIGN PATENT DOCUMENTS

DE 10 2005 045387 A1 3/2007
DE 10 2009 012252 A1 9/2010
(Continued)

OTHER PUBLICATIONS

EP2256314 to Ralf et al (English translation of EP2256314 by Espacenet, Dec. 1, 2010).*
(Continued)

*Primary Examiner* — Thai Ba Trieu
*Assistant Examiner* — Deming Wan
(74) *Attorney, Agent, or Firm* — John C. James

(57) ABSTRACT

An engine cylinder head and turbocharger assembly includes a turbocharger having a turbine housing, wherein part of the turbine housing is integrated into a casting of the engine cylinder head. The turbocharger is arranged with respect to the engine cylinder head such that the rotational axis of the turbocharger is transverse to the engine axis along which the engine cylinders are spaced. A compressor housing of the turbocharger is oriented toward an air intake side of the engine cylinder head, and the turbine housing is oriented toward an exhaust side of the engine cylinder head.

10 Claims, 9 Drawing Sheets

(51) Int. Cl.

| | | |
|---|---|---|
| F02B 33/44 | (2006.01) | |
| F02B 37/02 | (2006.01) | |
| F01D 9/02 | (2006.01) | |
| F01D 17/10 | (2006.01) | |
| F01D 25/14 | (2006.01) | |
| F01D 25/16 | (2006.01) | |
| F01D 25/24 | (2006.01) | |
| F01D 25/26 | (2006.01) | |
| F01D 25/28 | (2006.01) | |
| F01N 3/04 | (2006.01) | |
| F01N 13/10 | (2010.01) | |
| F02B 39/00 | (2006.01) | |
| F02B 67/10 | (2006.01) | |
| F02F 1/24 | (2006.01) | |

(52) U.S. Cl.
CPC ............... *F01D 25/14* (2013.01); *F01D 25/16* (2013.01); *F01D 25/162* (2013.01); *F01D 25/24* (2013.01); *F01D 25/265* (2013.01); *F01D 25/28* (2013.01); *F01N 3/046* (2013.01); *F01N 13/105* (2013.01); *F02B 39/005* (2013.01); *F02B 67/10* (2013.01); *F02F 1/24* (2013.01); *F02F 1/243* (2013.01); *F05D 2230/53* (2013.01); *F05D 2250/313* (2013.01); *Y02T 10/144* (2013.01); *Y02T 10/20* (2013.01)

(56) References Cited

U.S. PATENT DOCUMENTS

| | | | | |
|---|---|---|---|---|
| 5,146,752 | A | * | 9/1992 | Bruestle ..................... 60/602 |
| 5,560,207 | A | * | 10/1996 | Ramsden et al. ............ 60/605.1 |
| 7,806,110 | B1 | | 10/2010 | Broman et al. |
| 8,573,929 | B2 | | 11/2013 | Lombard et al. |
| 2005/0144946 | A1 | | 7/2005 | Claus |
| 2008/0034754 | A1 | * | 2/2008 | Hummel et al. ............ 60/605.2 |
| 2010/0175374 | A1 | | 7/2010 | Steiner et al. |
| 2010/0180592 | A1 | | 7/2010 | Williams et al. |
| 2011/0048003 | A1 | * | 3/2011 | Chen .......................... 60/605.2 |

FOREIGN PATENT DOCUMENTS

| | | |
|---|---|---|
| EP | 1 536 141 A1 | 6/2005 |
| EP | 2 143 922 A1 | 1/2010 |
| EP | 2 256 314 A1 | 12/2010 |
| FR | 2 849 470 A1 | 7/2004 |
| JP | 2002 303145 A | 10/2002 |
| WO | WO 2004/113686 A1 | 12/2004 |
| WO | WO 2010/102696 A2 | 9/2010 |

OTHER PUBLICATIONS

International Search Report and Written Opinion for Application No. PCT/US2011/065791 dated Jun. 22, 2012.

* cited by examiner

TURBOCHARGER AND ENGINE CYLINDER HEAD ASSEMBLY

BACKGROUND OF THE INVENTION

The present disclosure relates to exhaust gas-driven turbochargers, and particularly relates to turbocharger and engine cylinder head assemblies.

On next-generation gasoline engines, the tendency is toward integrating the exhaust manifold into the cylinder head. This provides some advantages in performance because the exhaust manifold pipes and their associated volumes can be reduced, and because the engine can be operated with slightly less enrichment at full load and high engine speed by virtue of exhaust gas cooling performed by the engine water coolant passing around the exhaust manifold. Thus, the trend in gasoline engine development appears to be toward making all such engines turbocharged, such that the turbo system will become a necessary part of the engine.

BRIEF SUMMARY OF THE DISCLOSURE

A possible next step beyond exhaust manifold integration is complete turbocharger integration into the engine cylinder head. However, a turbocharger includes sub-assemblies or parts that are very complex to fully integrate (for example the bearing system, which has to be balanced once assembled, or the turbine and compressor housings, which are complex in configuration and sensitive to design), and this may make it impractical to provide a cost-effective cylinder head casting that integrates the turbocharger. Furthermore, modifying the turbocharger (e.g., the A/R ratio) at development time could be a problem if the turbocharger were completely integrated in the cylinder head casting, as such modification would require modifying the cylinder head molds.

The present disclosure addresses issues such as those noted above.

The engine cylinder head and turbocharger assembly described in the present disclosure employs partial integration of the turbocharger in the cylinder head while allowing turbocharger design modifications that do not impact the cylinder head configuration. Additionally, the assembly results in an advantageous positioning and orientation of the turbocharger relative to the cylinder head.

In accordance with one embodiment described herein, the engine cylinder head and turbocharger assembly comprises: an engine cylinder head for an internal combustion engine having a plurality of cylinders spaced apart along an engine axis, the engine cylinder head comprising a casting and having an intake side on one side of the engine axis and an exhaust side on an opposite side of the engine axis; and a turbocharger comprising a compressor wheel mounted within a compressor housing and a turbine wheel mounted within a turbine housing and connected to the compressor wheel by a shaft that extends along a turbocharger axis about which the shaft rotates, the turbocharger further comprising a center housing assembly connected between the compressor housing and the turbine housing, the center housing assembly containing bearings for the shaft, the turbine housing defining a volute that surrounds the turbine wheel and receives exhaust gas from the engine and a nozzle that directs exhaust gas from the volute into the turbine wheel, the turbine housing further defining an axial bore through which exhaust gas that has passed through the turbine wheel is discharged from the turbine housing.

At least part of the turbine housing is an integral portion of the casting of the engine cylinder head, and the turbocharger is mounted to the engine cylinder head with the turbocharger axis oriented transverse to the engine axis and with the compressor housing oriented toward the intake side and the turbine housing oriented toward the exhaust side of the engine cylinder head.

In one embodiment, the turbine housing comprises a first turbine housing portion and a second turbine housing portion formed separately from the first turbine housing portion. The first turbine housing portion defines the volute and one wall of the nozzle and the second turbine housing portion defines an opposite wall of the nozzle. The second turbine housing portion is an integral portion of the casting of the engine cylinder head. This arrangement allows modifications to the turbocharger (e.g., the A/R ratio) to be made without having to change the casting of the cylinder head.

The cylinder head and turbocharger assembly can also include an exhaust manifold cap comprising a casting formed separately from the casting of the engine cylinder head and mounted to the exhaust side of the engine cylinder head. The exhaust manifold cap defines an internal space that collects exhaust gas from the cylinders of the engine via exhaust gas passages defined in the engine cylinder head. In one embodiment, the first turbine housing portion is an integral part of the casting of the exhaust manifold cap. Accordingly, if modifications to the turbocharger design (e.g., the A/R ratio) have to be made, only the relatively small and simple manifold cap casting need be altered, while the substantially more-complex cylinder head casting can remain the same.

The exhaust manifold cap can further define a coolant passage arranged to receive engine coolant from a corresponding passage in the engine cylinder head and circulate the coolant through the exhaust manifold cap, and the first turbine housing portion can define a coolant passage arranged to receive the coolant from the coolant passage in the exhaust manifold cap and circulate the coolant through the first turbine housing portion.

In one embodiment, the center housing comprises a single part formed by casting that integrates a backplate for the compressor and a backplate for the turbine. Additionally, the center housing and the second turbine housing portion are cooperatively configured such that the center housing is insertable into the second turbine housing portion in a direction parallel to the turbocharger axis. O-rings are engaged between the center housing and the second turbine housing portion to seal the interfaces therebetween. Optionally, the center housing, the shaft, the compressor wheel, and the turbine wheel form a cartridge that is insertable into the second turbine housing portion in the direction parallel to the turbocharger axis. In this embodiment, the compressor housing is formed separately from the second turbine housing portion and is secured to one side of the second turbine housing portion, and the first turbine housing portion is formed separately from the second turbine housing portion and is secured to the other side of the second turbine housing portion. This arrangement is particularly advantageous in that all of the complex and performance-sensitive parts of the turbocharger are included in the cartridge that is a self-contained unit separate from the cylinder head casting and its integral second turbine housing portion. Accordingly, design modifications on the turbocharger cartridge can be performed with complete freedom without impacting the design of the cylinder head casting.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Figure 1:
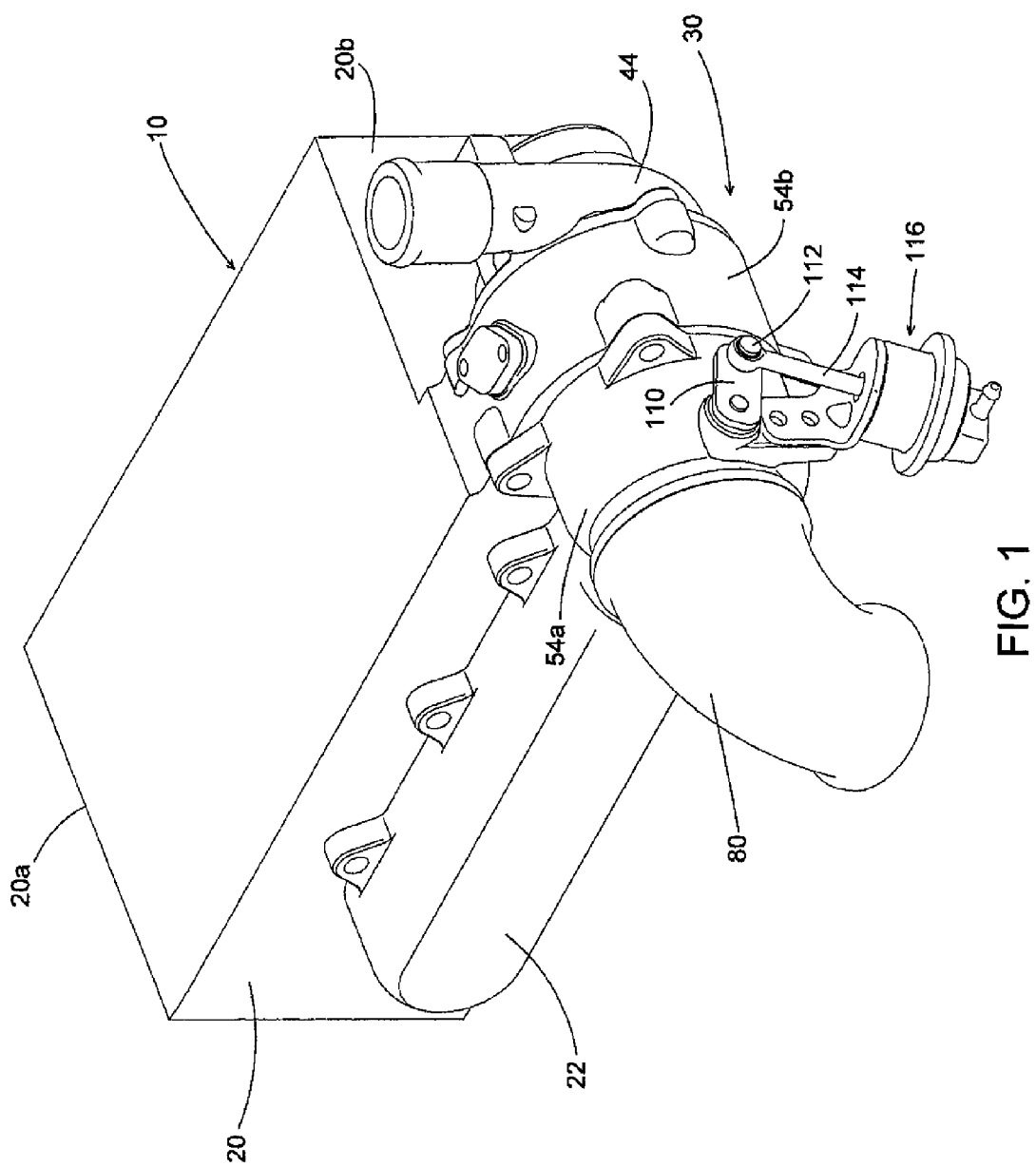
FIG. 1 is a perspective view of an engine cylinder head and turbocharger assembly in accordance with one embodiment of the present invention.
Figure 2:
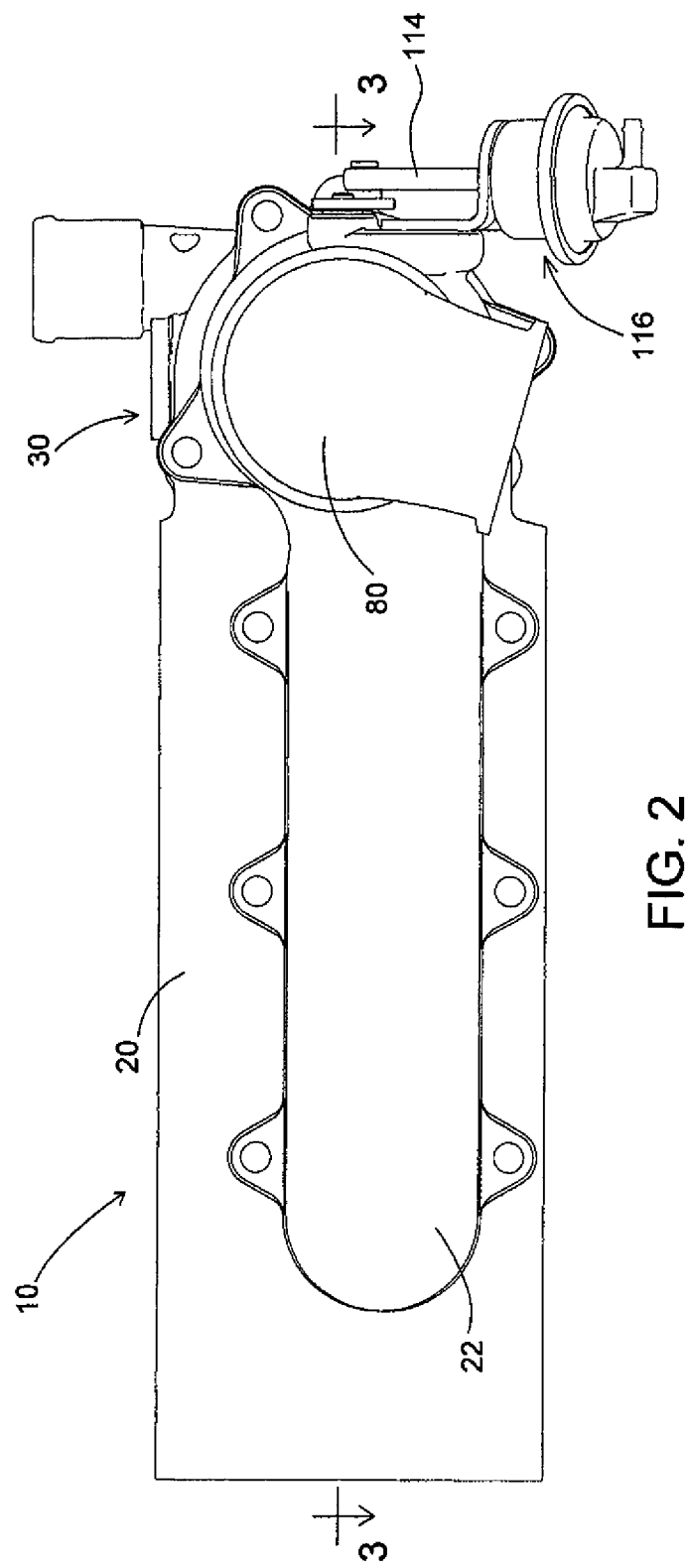
FIG. 2 is a side view of the engine cylinder head and turbocharger assembly of FIG. 1.

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

An engine cylinder head and turbocharger assembly 10 in accordance with one embodiment of the invention is depicted in FIGS. 1 through 5. The assembly 10 comprises an engine cylinder head 20 (illustrated only schematically) on which a turbocharger 30 is mounted. The engine cylinder head 20 comprises a casting that is configured to sit atop the engine block, above the engine cylinders. The head 20 typically houses components of the intake and exhaust valves for the cylinders and defines intake and exhaust passages through which intake air is delivered to the cylinders and exhaust gases are routed away from the cylinders, respectively. The drawings depict a cylinder head for a three-cylinder in-line engine, but the invention of course is applicable to any number and arrangement of cylinders.

With respect to an engine axis $A_E$ (FIG. 3) along which the engine cylinders are spaced, the head 20 has a first end 20a (at which typically the transmissions for the intake and exhaust valves are located) and an opposite second end 20b. The head 20 also has an intake side 20i and an exhaust side 20e. An intake manifold (not shown) typically is mounted to (or integrated into) the intake side 20i of the head 20 for delivering intake air to the cylinders via the intake passages in the head.

The assembly 10 also includes an exhaust manifold 22 that defines an internal space 24 for receiving and collecting exhaust gases from the engine cylinders via exhaust gas passages 26 defined in the head 20. As further described below, the exhaust gases collected in the manifold space 24 are delivered to the turbocharger 30. In the illustrated embodiment, the exhaust manifold 22 is a "cap" comprising a casting that is formed separately from the casting of the head 20. The exhaust manifold cap 22 is fastened to the exhaust side 20e of the head 20, such as by threaded fasteners. Alternatively, the manifold 22 could be integral with the head 20, as further described below.

The turbocharger 30 is located at the second end 20b of the head 20. The turbocharger 30 comprises a compressor 40 and a turbine 50. The compressor 40 includes a compressor wheel 42 surrounded by a compressor housing 44. The turbine 50 includes a turbine wheel 52 surrounded by a turbine housing 54. The compressor wheel 42 and turbine wheel 52 are affixed to opposite ends of a shaft 32 that rotates about a turbocharger axis $A_T$. The shaft 32 is held in bearings 34 disposed within a center housing 36 located between the compressor housing 44 and the turbine housing 54. The turbocharger 30 is oriented with its axis $A_T$ transverse to the engine axis $A_E$. In a typical engine installation in a vehicle, where the engine cylinders have their axes oriented generally vertically, the turbocharger axis $A_T$ is substantially horizontal.

Figure 3:
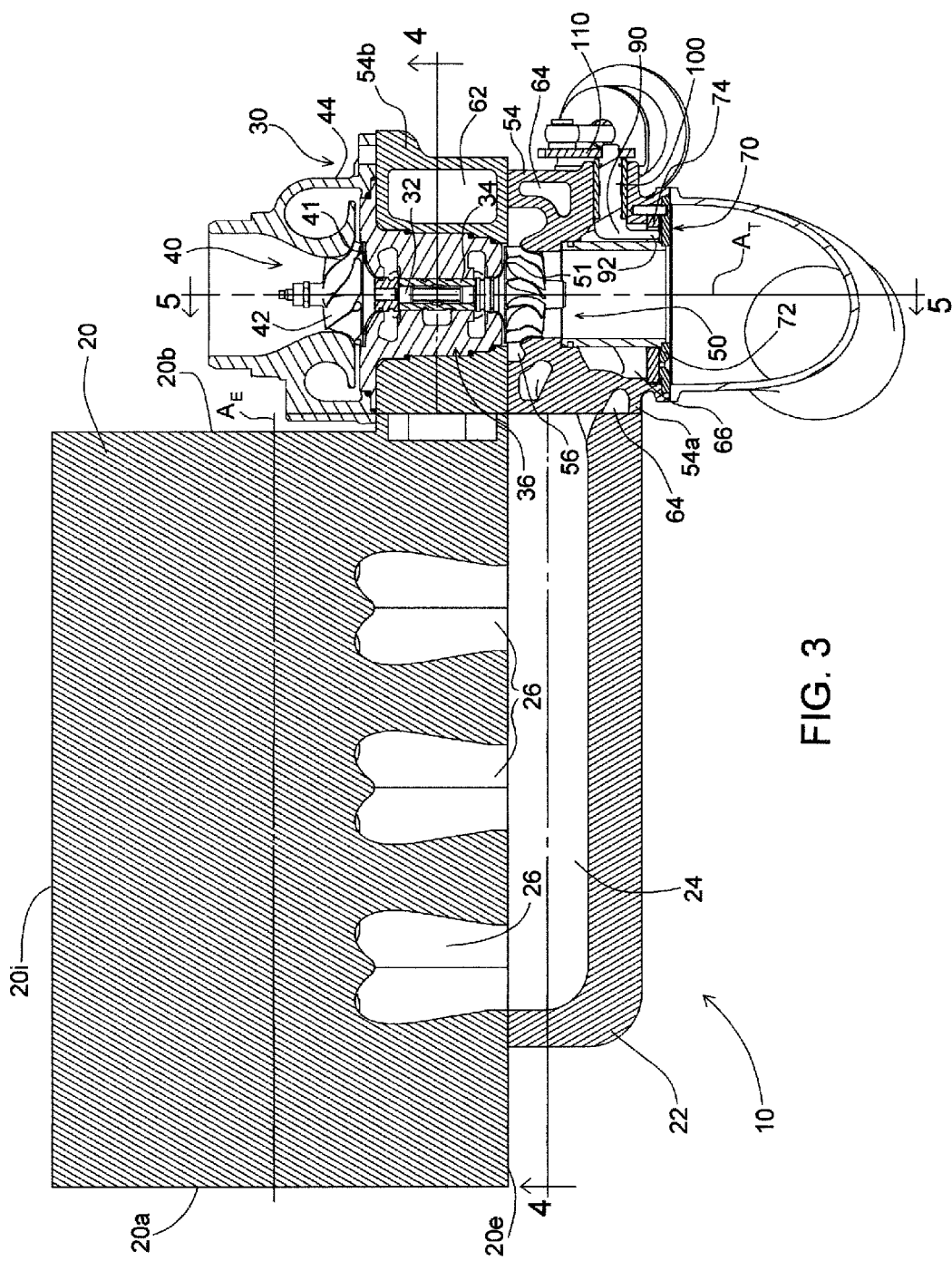
FIG. 3 is a cross-sectional view of the engine cylinder head and turbocharger assembly along line 3-3 in FIG. 1.
Figure 4:
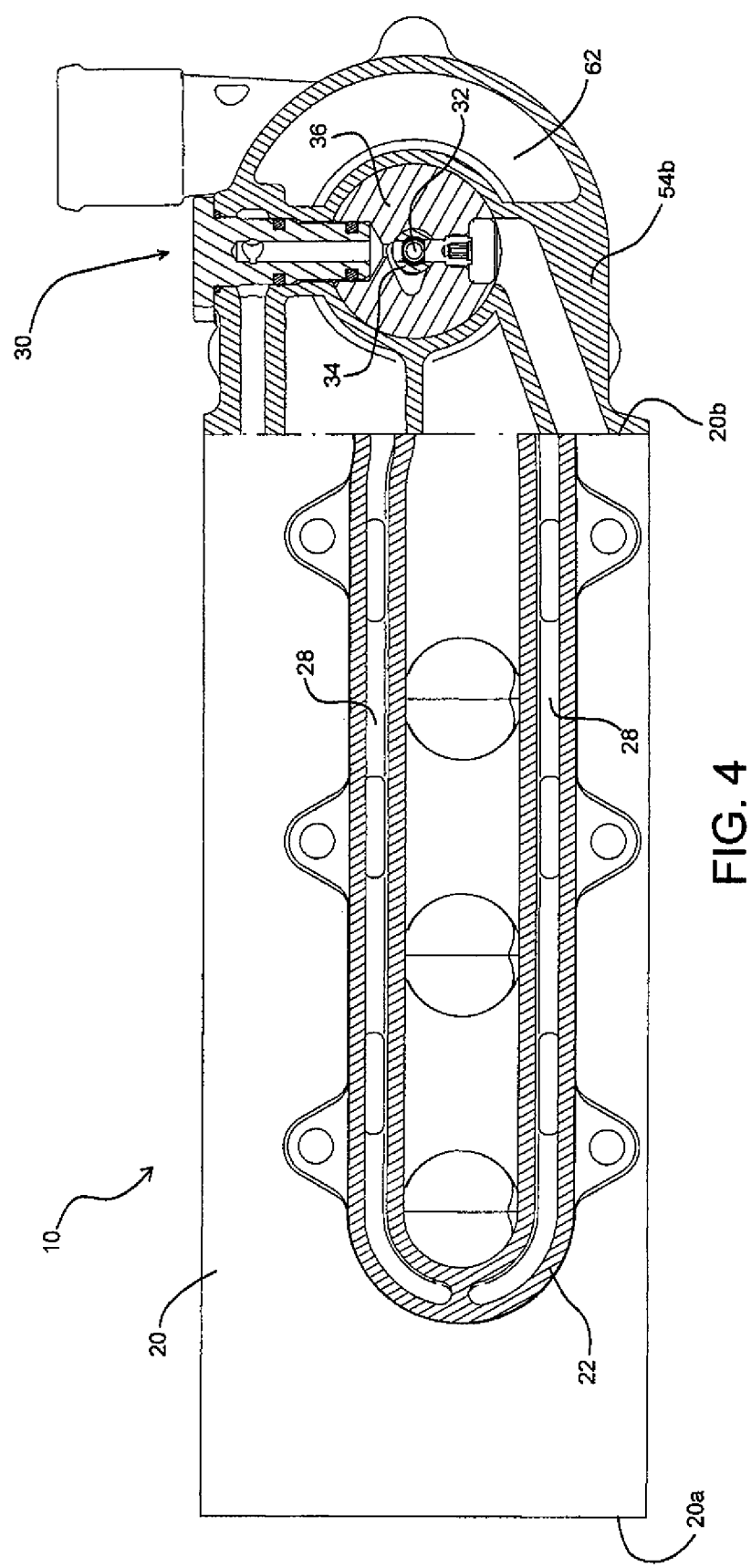
FIG. 4 is a cross-sectional view of the engine cylinder head and turbocharger assembly along line 4-4 in FIG. 3.

Additionally, the turbocharger 30 is positioned such that the compressor 40 is oriented toward the intake side 20i of the head 20, and the turbine 50 is oriented toward the exhaust side 20e of the head, as best seen in FIG. 3. This has the advantage that thermal separation between the hot exhaust side 20e of the head and the compressor 40 is increased relative to a more-conventional positioning of the turbocharger that would place the turbocharger adjacent the exhaust side 20e with its axis $A_T$ parallel to the engine axis. Such increased thermal isolation in turn should result in less heating of the intake air by the hot exhaust side of the cylinder head, which is beneficial for engine performance.

The turbine housing 54 can be made up of two separately formed turbine housing portions. A first turbine housing portion 54a defines a volute 56 that receives exhaust gas from the space 24 in the exhaust gas manifold 22. The volute 56 in the illustrated embodiment is open on the side of the first turbine housing portion 54a that faces the compressor housing 44, and the open side of the volute is closed by the second turbine housing portion 54b that is fastened to the first turbine housing portion 54a (e.g., by threaded fasteners). A nozzle 58 leading from the volute 56 into the turbine wheel 52 is formed between the first turbine housing portion 54a and the second turbine housing portion 54b.

In the illustrated embodiment, the center housing 36 comprises a single part (e.g., formed by casting) that integrates the backplate 41 for the compressor 40 and the backplate 51 for the turbine 50 (FIG. 3) and also accommodates the bearings 34 and defines oil passages for feeding oil to the bearings and draining oil from the bearings for recirculation to the engine oil system.

Figure 5:
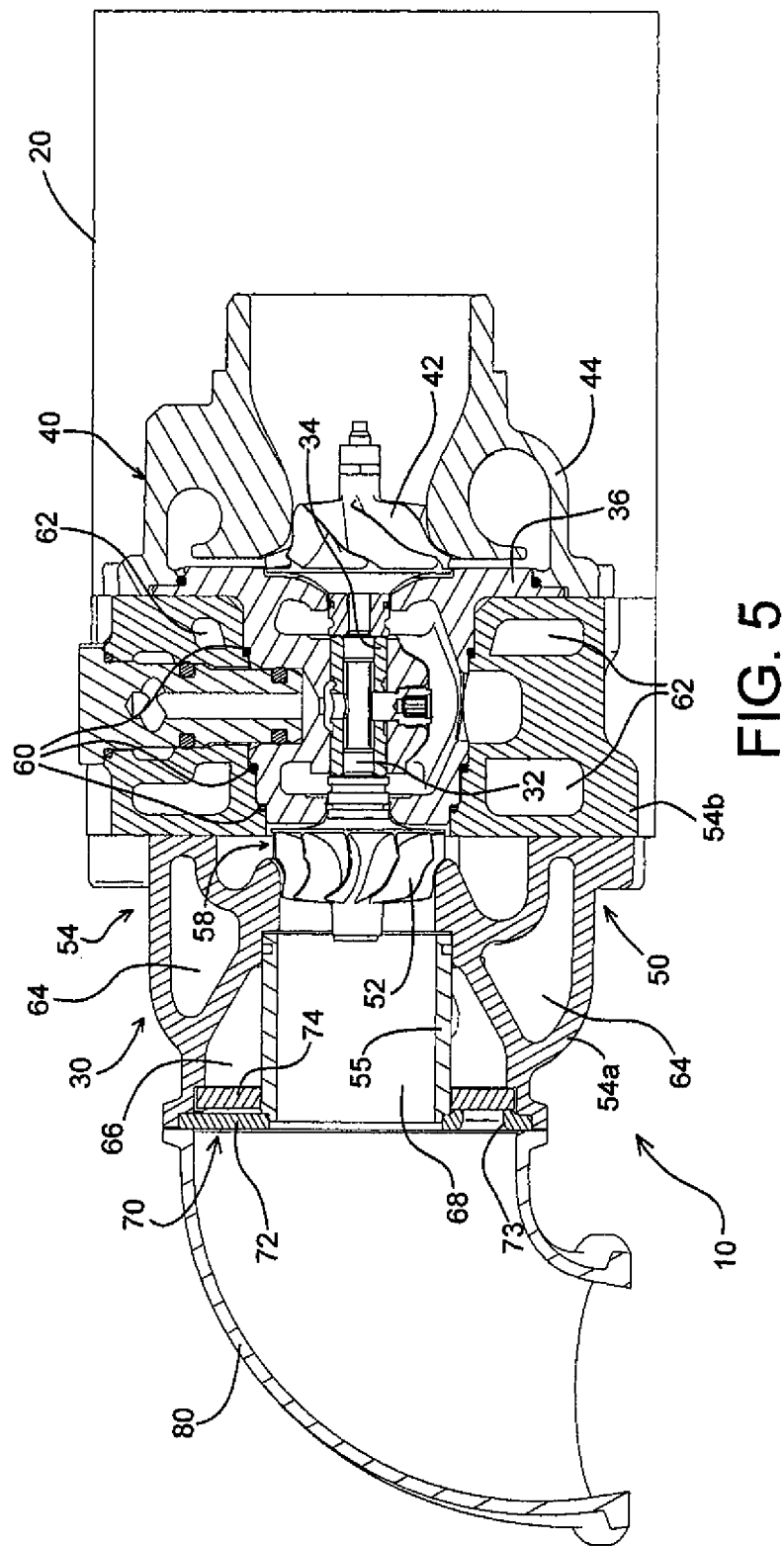
FIG. 5 is a cross-sectional view of the engine cylinder head and turbocharger assembly along line 5-5 in FIG. 3.

Furthermore, in the illustrated embodiment, the center housing 36 and the second turbine housing portion 54b are cooperatively configured such that the center housing 36 is insertable into the second turbine housing portion 54b in a direction parallel to the turbocharger axis $A_T$ (in the right-to-left direction in FIG. 5). Suitable O-rings 60 are engaged between the center housing 36 and the second turbine housing portion 54b to seal the interfaces therebetween. The center housing 36 and the rotor assembly (i.e., shaft 32, compressor wheel 42, and turbine wheel 52) form a "cartridge" (also known as a center housing rotating assembly or CHRA) that is thus inserted into the second turbine housing portion 54b. The compressor housing 44 is then secured to one side of the second turbine housing portion 54b and the first turbine housing portion 54a is secured to the other side of the second turbine housing portion.

Figure 6:
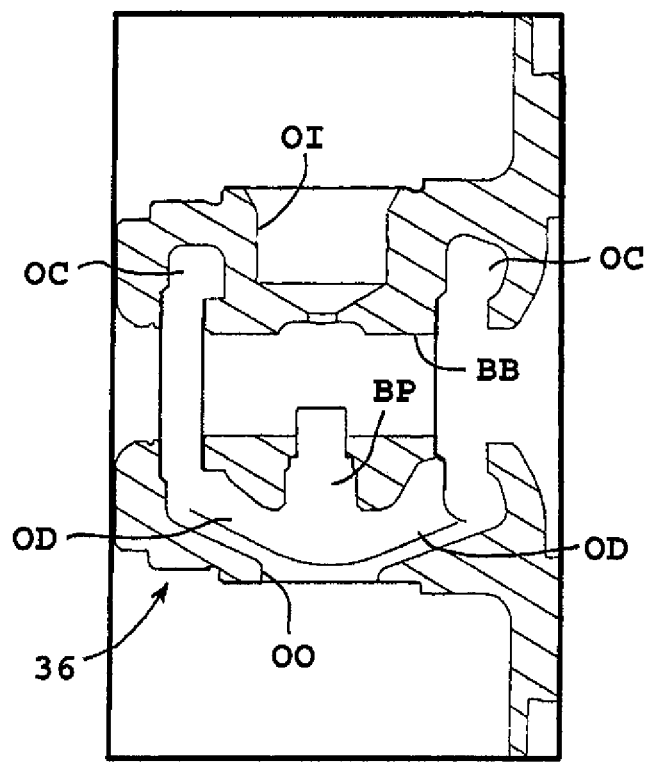
FIG. 6 is a cross-sectional view of the center housing of the turbocharger.

With reference to FIG. 6, which shows a cross-section through the center housing 36 in isolation, in one embodiment the center housing 36 can be machined from a solid piece of cylindrical bar stock. The outlines of the bar stock are shown in heavy lines, and the center housing 36 machined from the bar stock is shown in narrower lines. The center housing 36 includes external surface features such as steps, one or more flanges, and the like. The center housing further includes a bearing bore BB, an oil inlet OI, oil cavities OC, oil drain passages OD leading generally downward and toward each other from the oil cavities, an oil outlet OO that connects with the oil drain passages, and a bearing pin passage BP through which a pin extends and engages the bearing assembly for immobilizing the bearing assembly in the bearing bore. In accordance with this embodiment, starting with the solid cylindrical bar stock, the center housing 36 is machined by machining the external surface features, followed by machining the bearing bore BB, machining the oil inlet OI, and machining the oil cavities OC. Next the oil drain passages OD and oil outlet OO are machined. Finally, the bearing pin passage BP is machined either through the same hole as the oil outlet or through a separate hole at a location circumferentially displaced from the oil outlet. This sequence of steps can be varied if desired.

Additionally, in the illustrated embodiment, the second turbine housing portion 54*b* is an integral part of the casting of the engine cylinder head 20, as best seen in FIGS. 1 and 3. That is, the head 20 and the second turbine housing portion 54*b* are formed as an integral one-piece part by casting. Optionally, the second turbine housing portion 54*b* defines one or more coolant passages 62 for receiving coolant from the cylinder head 20 and circulating the coolant through the second turbine housing portion. The integral formation of the head 20 and second turbine housing portion 54*b* means that coolant can be passed between the head and the second turbine housing portion without the coolant having to cross any interfaces between these parts (and thus seals for sealing such interfaces are not required).

Furthermore, in the illustrated embodiment, the first turbine housing portion 54*a* and the manifold cap 22 are formed as an integral one-piece part by casting, and that part is separately formed from the cylinder head casting. Optionally, the first turbine housing portion 54*a* defines one or more coolant passages 64 for receiving coolant from coolant passages 28 in the manifold cap 22 and circulating the coolant through the first turbine housing portion. The integral formation of the manifold cap 22 and first turbine housing portion 54*a* means that coolant can be passed between the cap and the first turbine housing portion without the coolant having to cross any interfaces between these parts (and thus seals for sealing such interfaces are not required).

With reference to FIGS. 3 and 5, the assembly 10 can also include a turbine bypass valve 70 integrated into the assembly in a novel and particularly efficient manner. The exhaust gas flow path that supplies exhaust gas from the manifold cap 22 to the turbine housing volute 56 is also open to a generally annular bypass passage 66 defined in the first turbine housing portion 54*a*. The bypass passage 66 surrounds the axial bore 68 defined in the turbine housing. Exhaust gas that has passed through the turbine wheel 52 is exhausted from the turbine housing through the bore 68. The bypass passage 66 provides an alternative pathway for exhaust gas to flow without first having to pass through the turbine wheel 52. The bypass valve 70 is substantially as described in commonly owned co-pending U.S. patent application Ser. No. 12/771,434 filed on Apr. 30, 2010, the entire disclosure of which is hereby incorporated herein by reference.

The bypass valve 70 is installed in the bypass passage 66 for regulating flow through the bypass passage. With primary reference to FIGS. 1, 3, and 5, the major components of the annular bypass valve 70 include a stationary valve seat 72 and a rotary valve member 74 in abutting engagement with the valve seat. The valve seat 72 and valve member 74 are arranged between the first turbine housing portion 54*a* and a tubular inner member 55. As shown, the inner member 55 is formed separately from the first turbine housing portion 54*a* and is connected with an integral portion of the first turbine housing portion, but in other embodiments the inner member can be an integral part of the turbine housing. The first turbine housing portion 54*a* and inner member 55 define an annular space between them for receiving the valve member 74 and the valve seat 72. The valve member 74 is prevented from moving axially upstream by a shoulder defined by the first turbine housing portion 54*a*, although during operation pressure of the exhaust gas urges the valve member 74 in the downstream direction. The valve member 74 is not constrained by the turbine housing but is free to rotate about its axis and to move axially against the valve seat 72. The valve seat 72 is captured between the first turbine housing portion 54*a* and an exhaust conduit 80 that is fastened to the first turbine housing portion 54*a* and receives exhaust gas from the bore 68 of the turbine housing. Accordingly, the valve seat 72 is prevented from moving axially, radially, or rotationally. A radially outer edge portion of the upstream face of the valve seat 72 (i.e., the right-hand face in FIG. 5) abuts a shoulder defined by the first turbine housing portion 54*a*, and the radially inner edge portion of the upstream face abuts a shoulder defined by the inner member 55, thereby putting the valve seat in a precise axial location as dictated by these shoulders.

The valve seat 72 is a generally flat ring-shaped or annular member having a plurality of orifices 73 (FIG. 5) circumferentially spaced apart about a circumference of the valve seat, the orifices 73 extending generally axially between the upstream and downstream faces of the valve seat. The orifices 73 can be uniformly or non-uniformly spaced about the circumference of the valve seat.

The rotary valve member 74 is a generally flat ring-shaped or annular member having a plurality of orifices (not visible in the drawings) circumferentially spaced apart about a circumference of the valve seat, the orifices extending generally axially between the upstream and downstream faces of the valve member. The orifices can be uniformly or non-uniformly spaced about the circumference of the valve member. The number and spacing of the orifices in the valve member are the same as the number and spacing of the orifices 73 in the valve seat. The valve member 74 has a substantially circular cylindrical outer edge and a substantially circular cylindrical inner edge, the outer and inner edges being coaxial with respect to a central longitudinal axis of the valve member, which axis is also substantially coincident with a central longitudinal axis of the valve seat 72. The first turbine housing portion 54*a* and the inner member 55 both define substantially circular bearing surfaces for the outer and inner edges of the rotary valve member 74 and there are clearances therebetween, so that the valve member can be rotated in one direction or the opposite direction about its central longitudinal axis in order to vary a degree of alignment between the valve member orifices and the valve seat orifices 73, as further described below.

With reference to FIG. 3, the valve member 74 is engaged by the distal end 92 of an L-shaped drive arm 90 that is rigidly affixed to a distal (radially inner) end of a rotary drive member 100. The rotary drive member 100 penetrates substantially radially through the first turbine housing portion 54*a* via a bore that connects with the generally annular bypass passage 66. The proximal (radially outer) end of the rotary drive member 100 is located outside the first turbine housing portion 54a and is rigidly affixed to a link 110. The link 110 has a connecting member 112 (FIG. 1) that is offset from the rotation axis of the rotary drive member 100 and that can be coupled to an actuator rod 114 of an actuator 116 such that extension of the actuator rod 114 causes the link 110 to rotate the rotary drive member 100 in one direction and retraction of the actuator rod causes the link to rotate the rotary drive member in the opposite direction. As a result, the drive arm 90 affixed to the distal end of the rotary drive member 100 in turn causes the valve member 74 to be rotated in one direction or the opposite direction about its axis.

When the valve member 74 is positioned such that each of its orifices is located between two adjacent orifices 73 in the valve seat 72, with no overlap therebetween, the bypass valve is closed, such that essentially no exhaust gas can pass through the bypass passage 66 (except perhaps for a very small leakage flow of no appreciable consequence).

In a "crack-open" position of the valve 70, the valve member 74 is rotated a small amount such that there just begins to be some overlap between the orifices of the valve seat and valve member.

With further rotation of the valve member 74, a greater degree of overlap exists between the orifices and the valve is partially open.

In a fully open position of the valve, there is the maximum possible overlap between the orifices in the valve seat and valve member.

With the described annular bypass valve 70, exhaust gas pressure acts on the valve member 74 in a direction toward the fixed valve seat 72, thereby tending to improve sealing between the valve member and valve seat. Furthermore, the gas pressure does not tend to open the valve, in contrast to the aforementioned swing and poppet style bypass valve arrangements in which gas pressure acts in a direction tending to open the valve and cause leakage. The improved sealing made possible by the valve 70 is thought to be significant because it can improve the transient response time of the turbocharger, by making better use of instantaneous engine pulses in the exhaust gas stream, especially at low engine speeds and gas flow rates where the pulse impact is most significant in regard to turbine efficiency.

A further advantage is that the valve 70 can achieve better controllability than is typically possible with swing or poppet valves, particularly at the crack-open point. In particular, the evolution of the shape and size of the flow passages through the valve as the valve member 74 is rotated can be tailored to the needs of a particular application simply by suitably configuring the sizes, angular locations (e.g., whether uniformly or non-uniformly spaced apart), and shapes of the orifices in the valve member and valve seat.

Figure 7:
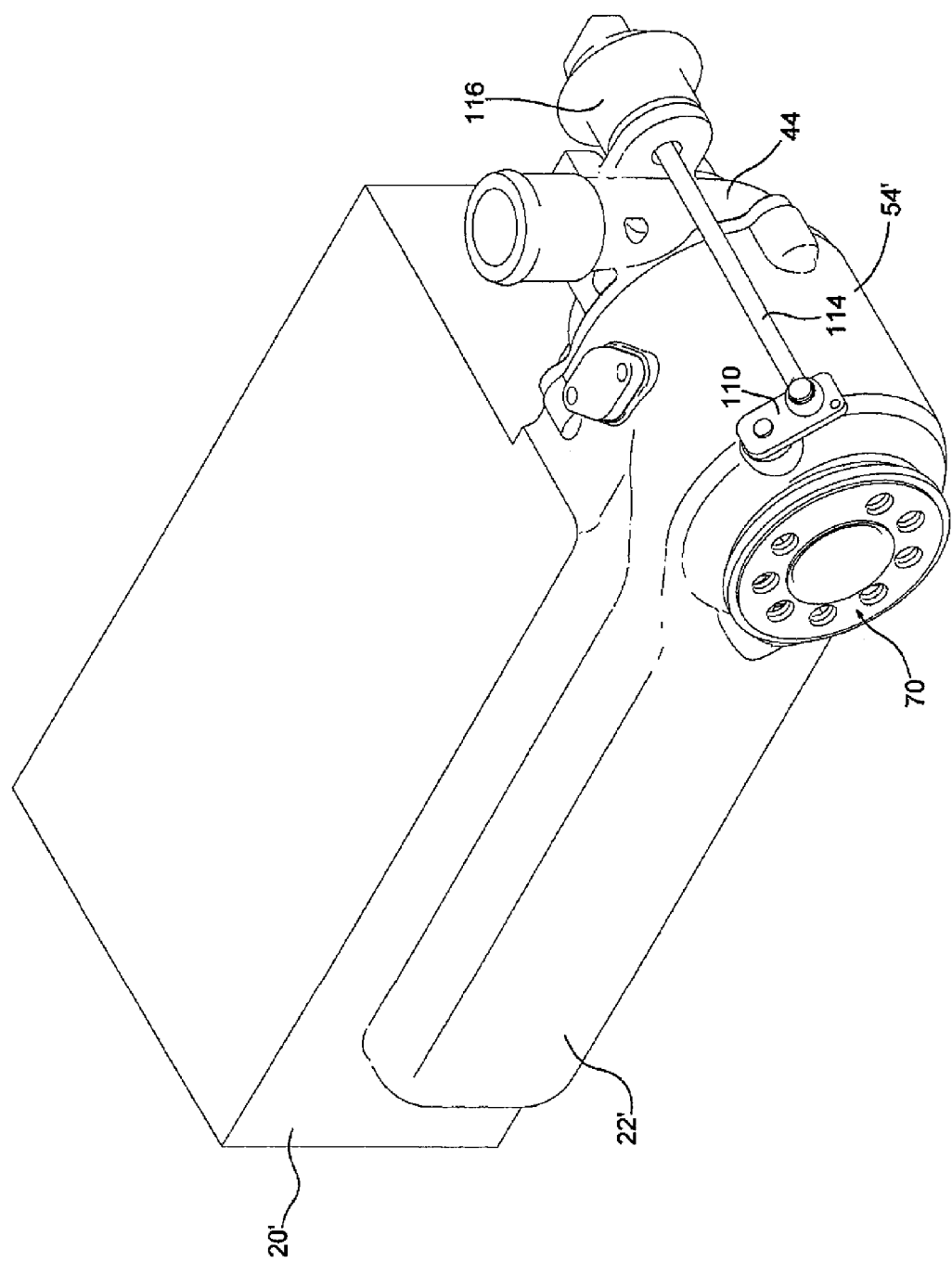
FIG. 7 is a perspective view of an engine cylinder head and turbocharger assembly in accordance with another embodiment of the present invention.
Figure 8:
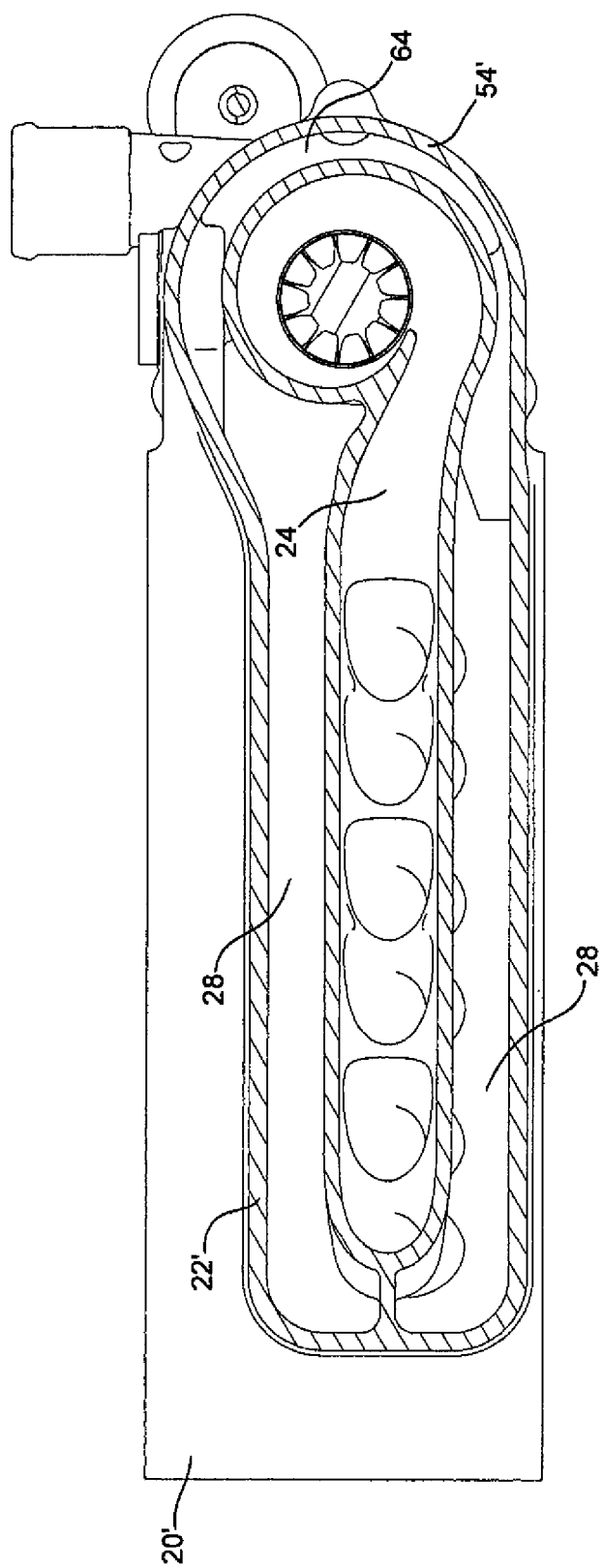
FIG. 8 is a front view of the assembly of FIG. 7, partly in section to show internal details of the exhaust manifold and integral turbine housing.
Figure 9:
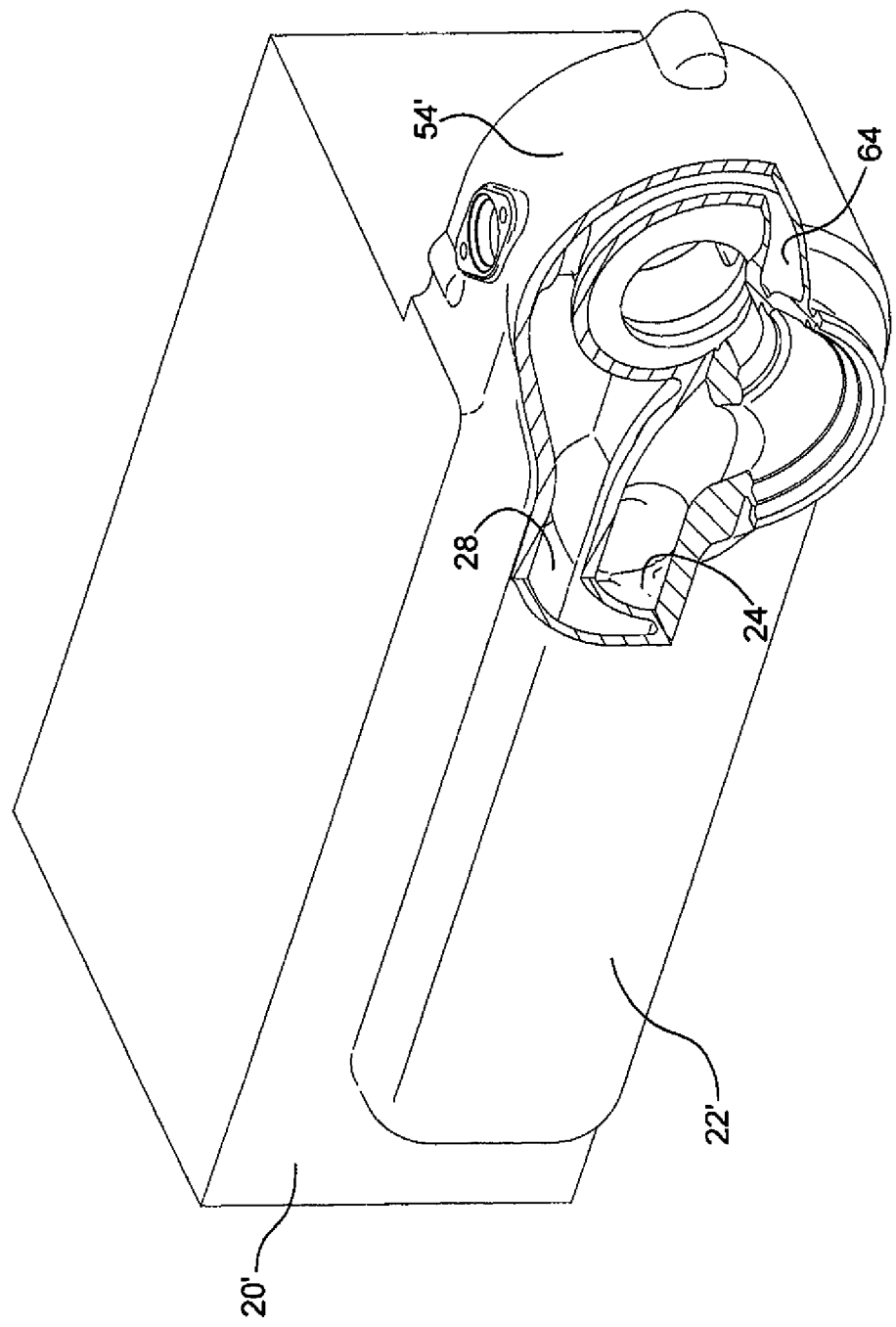
FIG. 9 is a perspective view of the engine cylinder head and integral exhaust manifold and turbine housing used in the assembly of FIG. 7, partly sectioned to show internal details of the exhaust manifold and turbine housing.

FIGS. 7 through 9 illustrate an alternative embodiment of the invention in which the cylinder head 20', manifold 22', and turbine housing 54' can comprise an integral one-piece part made by casting. This embodiment retains the advantage that the center housing rotating assembly (i.e., the center housing 36 together with the shaft 32 and wheels 42 and 52) can still be inserted as a unit into the turbine housing 54', but does not have the advantage of the previously described embodiment in which modifications to the A/R ratio of the turbine can be made without having to alter the cylinder head casting.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An engine cylinder head and turbocharger assembly comprising:
   an engine cylinder head for an internal combustion engine having a plurality of cylinders spaced apart along an engine axis, the engine cylinder head comprising a casting and having an intake side on one side of the engine axis and an exhaust side on an opposite side of the engine axis; and
   a turbocharger comprising a compressor wheel mounted within a compressor housing and a turbine wheel mounted within a turbine housing and connected to the compressor wheel by a shaft that extends along a turbocharger axis about which the shaft rotates, the turbocharger further comprising a center housing connected between the compressor housing and the turbine housing, the center housing containing bearings for the shaft, the turbine housing defining a volute that surrounds the turbine wheel and receives exhaust gas from the engine and a nozzle that directs exhaust gas from the volute into the turbine wheel, the turbine housing further defining an axial bore through which exhaust gas that has passed through the turbine wheel is discharged from the turbine housing;
   wherein at least part of the turbine housing is an integral portion of the casting of the engine cylinder head, and wherein the turbocharger is mounted to the engine cylinder head with the turbocharger axis oriented transverse to the engine axis and with the compressor housing oriented toward the intake side and the turbine housing oriented toward the exhaust side of the engine cylinder head, wherein the turbine housing comprises a first turbine housing portion and a second turbine housing portion formed separately from the first turbine housing portion, wherein the first turbine housing portion defines the volute and one wall of the nozzle and the second turbine housing portion defines an opposite wall of the nozzle, and wherein at least the second turbine housing portion is an integral portion of the casting of the engine cylinder head.

2. The engine cylinder head and turbocharger assembly of claim 1, further comprising an exhaust manifold cap comprising a casting formed separately from the casting of the engine cylinder head and mounted to the exhaust side of the engine cylinder head, the exhaust manifold cap defining an internal space that collects exhaust gas from the cylinders of the engine via exhaust gas passages defined in the engine cylinder head, and wherein the first turbine housing portion is an integral part of the casting of the exhaust manifold cap.

3. The engine cylinder head and turbocharger assembly of claim 2, wherein the exhaust manifold cap further defines a coolant passage arranged to receive engine coolant from a corresponding passage in the engine cylinder head and circulate the coolant through the exhaust manifold cap, and wherein the first turbine housing portion defines a coolant passage arranged to receive the coolant from the coolant passage in the exhaust manifold cap and circulate the coolant through the first turbine housing portion.

4. The engine cylinder head and turbocharger assembly of claim 1, wherein the turbine housing defines an annular bypass passage surrounding the axial bore and arranged to allow exhaust gas to bypass the turbine wheel, and the turbocharger further comprises:

an annular bypass valve disposed in the annular bypass passage, the annular bypass valve comprising a fixed annular valve seat and a rotary annular valve member arranged coaxially with the valve seat relative to the turbocharger axis, the valve member being disposed against the valve seat and being rotatable about the axis for selectively varying a degree of alignment between respective orifices defined through each of the valve seat and the valve member, ranging from no alignment defining a closed condition of the bypass valve, to at least partial alignment defining an open condition of the bypass valve.

5. The engine cylinder head and turbocharger assembly of claim 1, wherein the center housing comprises a single part formed by casting that integrates a backplate for the compressor and a backplate for the turbine.

6. The engine cylinder head and turbocharger assembly of claim 5, wherein the center housing and the second turbine housing portion are cooperatively configured such that the center housing is insertable into the second turbine housing portion in a direction parallel to the turbocharger axis.

7. The engine cylinder head and turbocharger assembly of claim 6, wherein O-rings are engaged between the center housing and the second turbine housing portion to seal the interfaces therebetween.

8. The engine cylinder head and turbocharger assembly of claim 6, wherein the center housing, the shaft, the compressor wheel, and the turbine wheel form a cartridge that is insertable into the second turbine housing portion in said direction parallel to the turbocharger axis.

9. The engine cylinder head and turbocharger assembly of claim 8, wherein the compressor housing is formed separately from the second turbine housing portion and is secured to one side of the second turbine housing portion, and the first turbine housing portion is formed separately from the second turbine housing portion and is secured to the other side of the second turbine housing portion.

10. The engine cylinder head and turbocharger assembly of claim 1, wherein the center housing and the turbine housing are cooperatively configured such that the center housing is insertable into the turbine housing in a direction parallel to the turbocharger axis, and the center housing, the shaft, the compressor wheel, and the turbine wheel form a cartridge that is insertable into the turbine housing in said direction parallel to the turbocharger axis.

* * * * *